Figure 1:
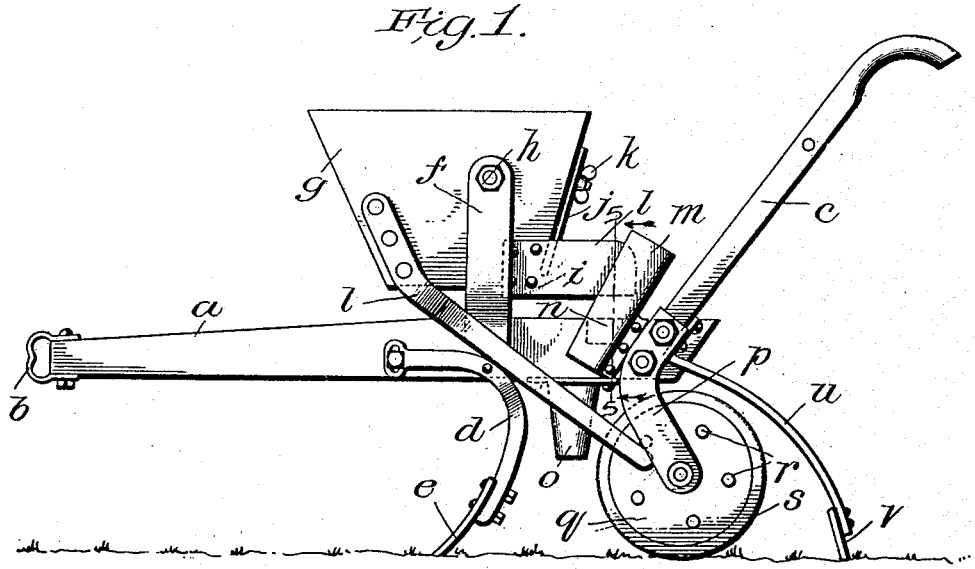

No. 771,129. PATENTED SEPT. 27, 1904.
J. G. DANIEL.
FERTILIZER DISTRIBUTER.
APPLICATION FILED MAY 20, 1904.
NO MODEL. 2 SHEETS—SHEET 1.

No. 771,129. PATENTED SEPT. 27, 1904.
J. G. DANIEL.
FERTILIZER DISTRIBUTER.
APPLICATION FILED MAY 20, 1904.
NO MODEL. 2 SHEETS—SHEET 2.
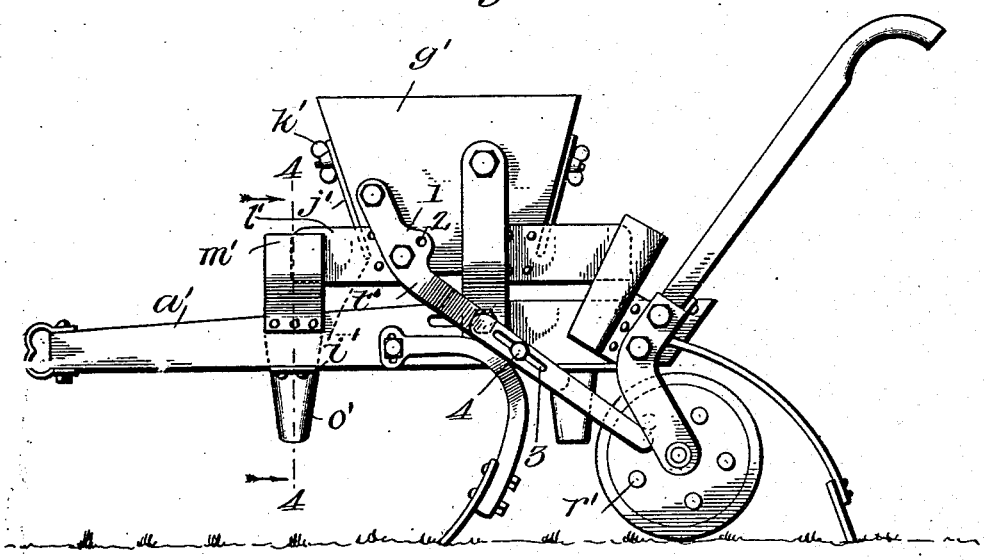
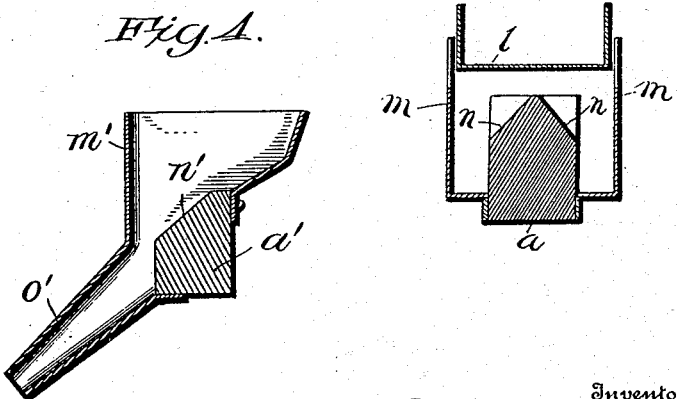

No. 771,129.    BEST AVAILABLE COPY    Patented September 27, 1904.

UNITED STATES PATENT OFFICE.

JOHN G. DANIEL, OF MORGAN, GEORGIA.

FERTILIZER-DISTRIBUTER.

SPECIFICATION forming part of Letters Patent No. 771,129, dated September 27, 1904.

Application filed May 20, 1904. Serial No. 208,919. (No model.)

*To all whom it may concern:*

Be it known that I, JOHN G. DANIEL, a citizen of the United States, residing at Morgan, in the county of Calhoun and State of Georgia, have invented certain new and useful Improvements in Fertilizer-Distributers; and I do hereby declare the following to be a full, clear, and exact description of the invention, such as will enable others skilled in the art to which it appertains to make and use the same.

This invention relates to distributers, more particularly to fertilizer-distributers; and the objects of the invention are to improve the construction of such devices and increase their efficiency of operation.

Further objects of the invention are to so arrange the parts that the fertilizer may be distributed in a narrow margin or spread broadcast over the furrow, as may be desired, or may be distributed around growing crops or into a furrow already opened without material rearrangement of the parts.

To the accomplishment of these objects and such others as may hereinafter appear, the invention comprises the novel construction and combinations of parts hereinafter described, and particularly pointed out in the appended claims, reference being had to the accompanying drawings, forming a part hereof, in which the same reference characters designate like parts throughout the several views, and in which—

Figure 2:
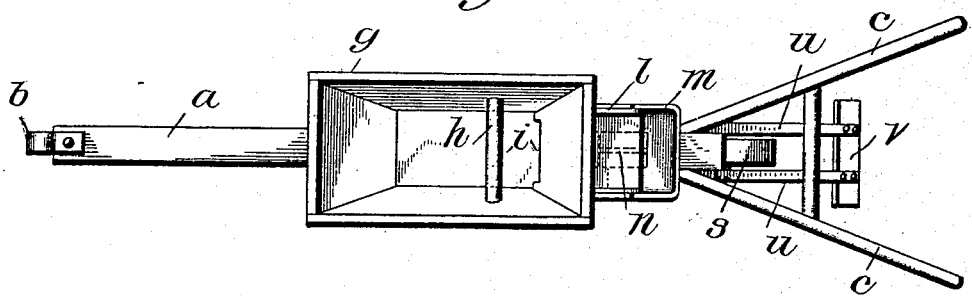

Figure 1 represents an elevational view of the distributer; Fig. 2, a plan view thereof; Fig. 3, an elevational view of the distributer shown in Figs. 1 and 2 provided with the crop-fertilizing attachment; Fig. 4, a detail sectional view on line 4 4 of Fig. 3 looking in the direction of the arrows, and Fig. 5 is a detail sectional view on line 5 5 of Fig. 1 looking in the direction of the arrows.

In the present embodiment of my invention I have shown the apparatus with a vibrating or oscillating hopper mounted on an agricultural-implement frame and provided with means for regulating the quantity of material to be discharged therefrom into a dropper-tube and also with the other usual adjuncts of a shovel, plow, or other suitable furrow-opener and a coverer plate or blade which latter may or may not be used.

Referring to Figs. 1 and 2 of the drawings, $a$ may be an ordinary plow-beam provided at the front end with the usual clevis $b$ and at the rear with the usual guiding-handles $c$. To this beam, at some point intermediate the ends, is adjustably secured a plow-stock $d$, carrying a plow $e$ of any convenient type, here shown as a shovel-plow. At another convenient point on opposite sides of the plow-beam $a$ are secured a pair of spaced standards $f$, projecting upwardly and flaring outwardly and carrying between them a receptacle or hopper $g$, preferably pivotally secured thereto by means of a bolt $h$. The hopper $g$ is preferably in the form of an inverted truncated pyramid, and in one of its walls, as here shown the rear wall, is a feed-opening $i$, whose width of opening is controlled by a regulating-slide $j$, adjustably secured to the wall of the hopper above the opening by means of a bolt $k$, passing through a slot in the slide. Beneath the feeding-opening $i$ is attached in any suitable manner a feed-trough $l$, which extends into a dropper-trough $m$, which straddles the plow-beam $a$ at a point a convenient distance from the hopper $g$ and guides the fertilizer into the furrow. The plow-beam within the dropper trough is suitably beveled, as at $n$, so that the fertilizer will readily drop on both sides of the beam and be spread broadcast over the furrow; but if it is desired to concentrate the flow into a narrow margin a dropper-spout $o$, which may be of any suitable form, but is here shown funnel-shaped because of ease and cheapness of construction, is detachably secured to the under side of the beam $a$, so that the two streams from each side of the beam are caught and a single stream only flows into the furrow. The means for vibrating the hopper on the bolt $h$, which forms the pivot, consist of a driving-wheel suitably journaled between a pair of spaced hangers $p$, depending from the beam $a$. This wheel is preferably made in two sections, a metallic cast section $q$, formed on one side with a circularly-arranged set of projecting pins $r$, and an outside wood section or tire $s$. To the opper $g$ is secured an actuating-arm $t$, the lower end of which rests between the pins $r$ in such manner that when the driving-wheel is rotated the arm will be oscillated, consequently vibrating the hopper and passing fertilizer through the feed-opening therein and on down into the furrow. To the rear of the handles $c$ may be attached spring arms or straps $u$, to the lower end of which is secured transversely of the furrow a covering blade or plate $v$ for filling in the earth after the fertilizer has been deposited. This covering device may be used or not, as may be deemed convenient.

Referring to Figs. 3 and 4, the apparatus already described is disclosed with the addition of an adjustable actuating-arm and means for distributing the fertilizer in front as well as to the rear of the plow. In Fig. 3 the actuating-arm $t'$ has formed on it a lug 1, carrying an extra bolt-hole 2, whereby the angularity of the arm may be changed so as to throw fertilizer out of the forward end of the hopper $g'$ instead of its rear end, and said arm is further provided with a sliding joint 3, locked by any suitable means, as a bolt and nut 4, by means of which the arm $t'$ may be lengthened and adjusted so as to properly engage with the pins $r'$. The front wall of the hopper $g'$ is formed with a feed-opening $i''$, leading into a feed-trough $l'$ and regulated by a slide $j''$, locked by a bolt $k$, preferably similar in all respects to the same arrangements already described for the rear wall of the hopper. In order to distribute the fertilizer upon growing crops or into a furrow already opened, the plow-beam $a'$ is beveled on the right side only, as at $n'$, Fig. 4, and about this beveled portion is secured a dropper-trough $m'$, having an extending spout $o'$ for carrying said fertilizer outwardly.

The operation of the device is obvious and need not be described further than to say that by means of the regulating-slide an amount of fertilizer may be distributed in any varying quantity as may be desired with efficiency and uniformity of action, and by means of the arrangement of dropper-troughs and spouts above described may be placed on any part of the furrow or in another furrow or about growing crops, as may be desired.

It is of course understood that the invention is not limited to the particular point of attachment of the plow, hopper-standards, or driving-wheel hangers to the frame of the agricultural implement, as the driving-wheel may be located in front of the plow, if desired, and still be within the scope and spirit of the invention and without sacrificing any of the advantages thereof.

Obviously many and various other changes may be made in the invention, and some features thereof may be used without others. Therefore without limiting the invention to the construction shown and described or enumerating equivalents, I claim, and desire to secure by Letters Patent, the following:

1. In a fertilizer-distributer, a vibrating fertilizer-receptacle provided with a feed-opening at each end, substantially as described.

2. In a fertilizer-distributer, a fertilizer-receptacle provided with a feed-opening at each end, and means for vibrating said receptacle to distribute from either opening, substantially as described.

3. In a fertilizer-distributer, a fertilizer-receptacle provided with a feed-opening at each end, means for closing said openings when desired and means for vibrating said receptacle to distribute from either opening, substantially as described.

4. In a fertilizer-distributer, a vibrating hopper having a feed-opening at each end, and an adjustable actuating-arm therefor, whereby said hopper may be vibrated to discharge from either opening, substantially as described.

5. In a fertilizer-distributer, a vibrating hopper having a feed-opening at each end, and an actuating-arm therefor adjustable both as to its length and its angularity with relation to the hopper, whereby said hopper may be vibrated to discharge from either opening as desired, substantially as described.

6. In a fertilizer-distributer, the combination with a hopper having a feed-opening at each end pivotally mounted on an agricultural-implement frame, of means for vibrating said hopper to distribute from either opening as desired, means adjacent one opening for distributing in the furrow, and means adjacent the other opening for distributing around growing crops, substantially as described.

7. In a fertilizer-distributer, the combination with a hopper having a feed-opening at each end pivotally mounted on an agricultural-implement frame, of an adjustable actuating-arm for vibrating said hopper to distribute from either opening as desired, means adjacent one opening for distributing in the furrow, and means adjacent the other opening for distributing around growing crops, substantially as described.

8. In a fertilizer-distributer, the combination with a hopper having a feed-opening at each end pivotally mounted on an agricultural-implement frame, of a furrow-opener mounted on said frame below said hopper, means suitably mounted on said frame under said openings for distributing fertilizer to the front and to the rear of said furrow-opener, and means for vibrating said hopper to distribute from either opening as desired, substantially as described.

9. In a fertilizer-distributer, the combination with a hopper having a feed-opening at each end pivotally mounted on an agricultural-implement frame, of a furrow-opener mounted on said frame below said hopper, feed-troughs and dropper-spouts suitably mounted on said frame under said openings for distributing fertilizer to the front and to the rear of said furrow-opener, and an adjustable actuating-arm for vibrating said hopper to distribute from either opening as desired, substantially as described.

10. In a fertilizer-distributer, the combination with a vibrating hopper having a suitable feed-opening and mounted on an agricultural-implement frame, of a dropper-trough straddling the frame into which the fertilizer is fed by the vibrations of the hopper and a beveled portion on said frame adapted to divide the stream and spread said fertilizer broadcast over the furrow, substantially as described.

11. In a fertilizer-distributer, the combination with a vibrating hopper provided with a feed-opening and mounted on an agricultural-implement frame, of a dropper-trough straddling the frame into which the fertilizer is fed by the vibration of the hopper, a beveled portion on said frame adapted to divide the stream and spread said fertilizer broadcast over the furrow, and a covering-blade attached to said frame, substantially as described.

12. In a fertilizer-distributer, the combination with a hopper having a suitable feed-opening and mounted on an agricultural-implement frame, of means for vibrating said hopper comprising a drive-wheel provided with a series of projections, and an actuating-arm attached to said hopper and adapted to engage with said projections, a dropper-trough straddling the frame into which the fertilizer is fed by the vibrations of the hopper and a beveled portion on said frame adapted to divide the stream and spread said fertilizer broadcast over the furrow, substantially as described.

In testimony whereof I affix my signature in presence of two witnesses.

JOHN G. DANIEL.

Witnesses:
  A. I. MONROE,
  S. F. CLAYTON.